June 16, 1931.  U. A. INMAN  1,809,851

AUTOMOBILE SPRING

Filed May 26, 1928

INVENTOR.
ULYSSES A. INMAN.
By Arthur L. Slee
HIS ATTORNEY

Patented June 16, 1931

1,809,851

UNITED STATES PATENT OFFICE

ULYSSES A. INMAN, OF LONG BEACH, CALIFORNIA

AUTOMOBILE SPRING

Application filed May 26, 1928. Serial No. 280,866.

My invention relates to improvements in springs for automobiles and the like wherein a quarter spring is rigidly secured in outwardly extending relation to the end of a body frame member, and a main spring is rigidly secured at one end to said frame member and at the opposite end to the end of the quarter spring whereby the free ends of the springs may move upwardly and outwardly when the spring is flexed.

The primary object of my invention is to provide an improved spring suspension for automobiles and the like.

Another object is to provide an improved spring which will afford an efficient spring suspension without the use of shackles or bearing members.

A further object is to provide an improved spring structure of efficient resiliency and increased strength.

Another object is to provide an improved spring structure wherein the main leaf is supported along its full length by a second supporting leaf adapted to support the body of an automobile in event the main leaf should be broken without interfering or impairing the normal action of said main leaf.

Another object is to provide an improved spring structure and arrangement which may be economically manufactured and which will facilitate assembly and installation.

A still further object is to provide a spring of improved construction and increased efficiency.

I accomplish these and other objects by means of the improved device disclosed in the drawings forming a part of the present application wherein like characters of reference are used to designate similar parts throughout the specification and drawings, and in which—

Figure 1:
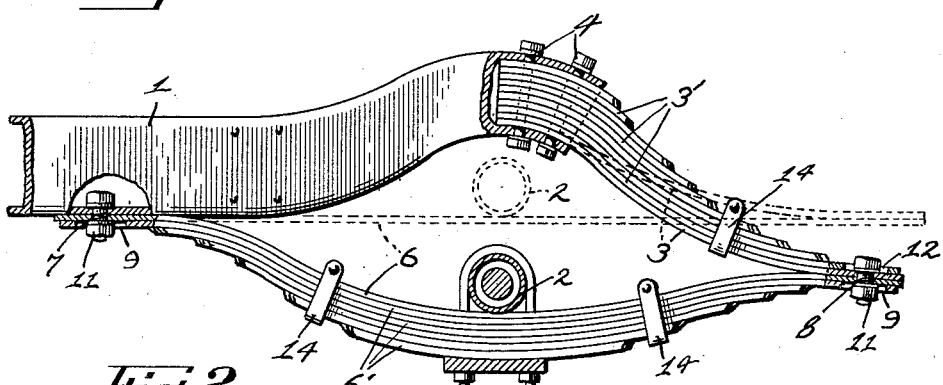
Fig. 1 is a side elevation of my improved spring in normal position as installed upon the frame of an automobile.

Referring to the drawings, the numeral 1 is used to designate a longitudinal frame member of an automobile chassis. The member 1 is of the usual channel form having the end upwardly curved to afford clearance above an axle housing 2. The extreme end of the member 1 is left open and is shaped to incline slightly downwardly, substantially as shown.

A quarter spring consisting of a main leaf 3 and a plurality of auxiliary or supporting leaves 3' is rigidly secured to the end of the member 1. The leaves 3 and 3' of the spring are preferably fitted into the open end of the frame member 1 and rigidly secured by bolts 4 extending through the upper and lower flanges of the channel member 1 and through the ends of the spring leaves to rigidly secure the leaves with their free ends extending longitudinally from the end of said frame member 1. The leaves 3 and 3' are shaped to extend downwardly along a curve of relatively long radius, as shown.

A main spring comprising a main leaf 6 and a plurality of auxiliary or supporting leaves 6' is mounted below the frame member 1 and quarter spring 3. The main leaf 6 is rigidly secured at its inner end to the frame member 1 by means of a suitable bolt 7 inserted through registering apertures formed in the member 1 and the end of the main leaf 6. The opposite end of the main leaf 6 is rigidly bolted to the adjacent outwardly extending end of the main leaf 3 of the quarter spring by means of a suitable bolt 8. The main spring 6 is normally curved as shown in Fig. 1 and arranged to have the axle housing 2 rigidly secured thereon in the ordinary manner to suspend the member 1 and the body of an automobile carried thereon upon the axle housing.

The second leaf of the main spring, that is, the leaf 6' positioned immediately next to the main leaf 6, is made of substantially the same length as said main leaf 6, the ends of said leaf 6' being extended past the securing bolts 7 and 8 and being provided with longitudinally disposed slots 9 adapted to fit over the heads or securing nuts 11 of said bolts whereby said second leaf may be slidably movable past the securing bolts. In like manner, the leaf 3' immediately next to the main leaf 3 of the quarter spring is provided with a slot 12 permitting the end of said leaf 3' to extend to the end of the leaf 3 and to be slidably movable past the head of the bolt 8. The succeeding leaves 3' and 6', of the quarter and main springs respectively, are made successively shorter and are held in assembled relation by suitable spring clips 14 in the ordinary manner.

Figure 2:
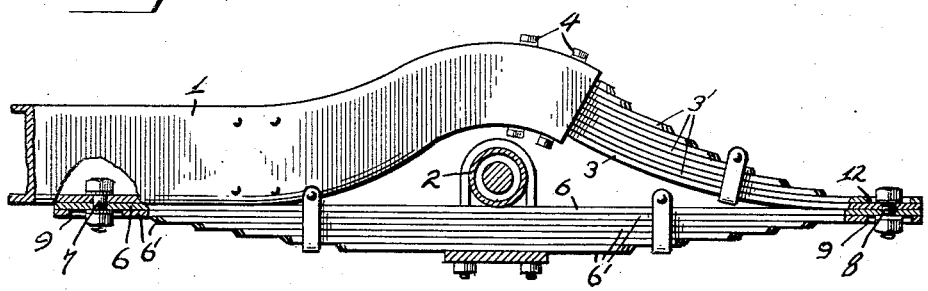
Fig. 2 is a similar view, with the spring to the position resulting when the spring is flexed under a heavy shock or load.
Figure 3:
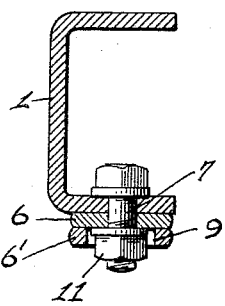
Fig. 3 is a transverse sectional detail, drawn upon a large scale and showing the manner in which the main spring is rigidly secured to the frame.
Figure 4:
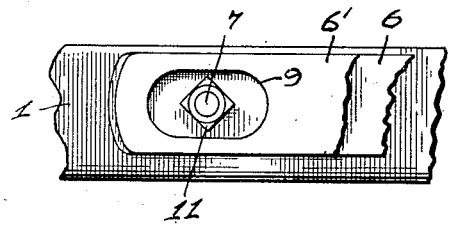
Fig. 4 is a broken bottom view of the spring securing means.

In operation, the quarter and main spring of each set are secured to the frame and to each other as shown. Under normal conditions, the weight of the automobile will be carried by the main spring 6 in the position shown in full lines in Fig. 1 of the drawings. When the spring is flexed by a sudden shock or by an increased load, the spring members are displaced to the position indicated in Fig. 2 and in dotted lines in Fig. 1. As the spring is compressed, the main leaf 6 is bent upwardly against the under side of the frame member 1 and at the same time, the outer ends of the main and quarter springs are moved upwardly and rearwardly as said springs are straightened, thereby causing an increased length of the main leaves 3 and 6 to lie in proximate contacting relation. The ends of the leaves 3 and 6, while rigidly secured to each other, are freely movable vertically and longitudinally as the springs are compressed, thereby accommodating the increased length of the springs as said springs are straightened.

As the main leaf 6 is moved to engage an increased length along the member 1 and leaf 3, the effective length of the spring leaf is shortened, and the resistance to further flexing is thereby proportionately increased. In this manner, the resistance due to shortening the effective spring length is added to the normal increased resistance to bending in the spring itself, and the efficiency of the spring in carrying an overload or when subjected to heavy shock is accordingly increased.

The second leaves 3' and 6' are extended to substantially the ends of the main leaves 3 and 6 respectively and are slotted so that in straightening the springs under load or shock, the said second leaves may be moved relatively to the bolts 7 and 8. In this manner, the second leaves do not interfere with the normal flexing of the main leaves, but in event a main leaf should break, the load will be carried by the adjacent second leaf and prevent the frame member 1 from dropping down onto the axle housing.

In the drawings, I have illustrated my improved spring only as applied to the rearward end of an automobile frame member to suspend said frame over the rear axle housing of an automobile. However, the device may be applied in a fully analogous manner to the front end of the frame to suspend the same over the front axle of the automobile. The specific details of structure and arrangement are of course subject to modification in numerous ways without departing from the spirit of my invention, and I therefore desire to avail myself of all modifications which may fall within the scope of the appended claims.

Having thus described my invention what I claim as new and desire to secure by Letters Patent is—

1. A spring suspension for automobiles comprising a quarter spring rigidly secured to the frame of an automobile and extending longitudinally therefrom; and a main spring rigidly secured at one end to the frame and rigidly secured at the opposite end to the outwardly extending end of the quarter spring, the flexing of the main spring being controlled at both ends by positive contacting engagement with the adjacent surfaces of the frame and quarter spring.

2. A spring suspension for automobiles comprising a quarter spring rigidly secured to the frame of an automobile and curved downwardly and rearwardly, said quarter spring extending longitudinally from the end of the frame; and a main spring rigidly secured at one end to the frame and rigidly secured at the opposite end to the outwardly extending end of the quarter spring, the joined ends of the main and quarter springs being secured in flat contacting relation to control relative flexing of the springs and being movable vertically and longitudinally when the spring is flexed.

3. A spring suspension for automobiles comprising a quarter spring having a main leaf rigidly secured to the frame of an automobile and extending longitudinally from the frame; a main spring having a main leaf rigidly secured at one end to the frame and rigidly secured at the opposite end to the main leaf of the quarter spring; and a plurality of supporting leaves mounted in proximate relation to the main leaf of each spring, the supporting leaf immediately next to each main leaf being slotted to receive the main leaf securing means to permit longitudinal movement and to prevent lateral movement of each supporting leaf relative to the adjacent main leaf.

4. A spring suspension for automobiles comprising a quarter spring having a main leaf rigidly secured to the frame of an automobile and extending longitudinally from the frame; a plurality of supporting leaves mounted in proximate relation to the main leaf; a main spring having a main leaf rigidly secured at one end to the frame and rigidly secured at the opposite end to the main leaf of the quarter spring; and a plurality of supporting leaves mounted in proximate relation to the main leaf of the main spring, the supporting leaf immediately next to said main leaf extending past the securing means at the ends of said main leaf and being slidably movable relative to said securing means.

5. A spring suspension for automobiles comprising a quarter spring having a main leaf rigidly secured to the frame of an automobile and extending longitudinally from the frame; a plurality of supporting leaves mounted in proximate relation to the main leaf; a main spring having a main leaf rigidly secured at one end to the frame and rigidly secured at the opposite end to the main leaf of the quarter spring; and a plurality of supporting leaves mounted in proximate relation to the main leaf of the main spring, the supporting leaves of the main and quarter springs immediately next to the main leaves of said springs extending past the securing means and being slidably movable relative to said securing means.

6. A spring suspension for automobiles comprising a quarter spring having a main leaf rigidly secured at one end to the frame of an automobile and extending longitudinally from the end of the frame; a second leaf mounted in proximate relation to the first leaf and slotted adjacent the outer end; a plurality of supporting leaves mounted in proximate relation to the main and second leaves; a main spring comprising a main leaf, a second leaf of substantially the same length as said main leaf and slotted adjacent the ends thereof, and a plurality of supporting leaves mounted in proximate relation to the main and second leaves of the spring; securing means rigidly securing the main leaf of the main spring to the frame, said securing means extending through the slot of the second leaf and permitting sliding movement thereof; and securing means rigidly securing the outer end of the main leaf of the main spring to the outwardly extending end of the main leaf of the quarter spring, said securing means extending through the slots of the second leaves and permitting sliding movement of said second leaves relative to the securing means.

7. A spring suspension for automobiles comprising a quarter spring consisting of a main leaf, a second leaf of substantially the same length as the main leaf and slotted adjacent the outer end thereof, and a plurality of supporting leaves; securing means rigidly securing the leaves of the quarter spring to the frame, the leaves extending longitudinally from the end of the frame; a main spring comprising a main leaf, a second leaf of substantially the same length as said main leaf and having slots adjacent the ends thereof, and a plurality of supporting leaves; a bolt rigidly securing one end of the main leaf of the main spring to the frame and extending through the slot of the second leaf to permit sliding movement thereof; and a bolt rigidly securing the opposite end of the main leaf of the main spring to the main leaf of the quarter spring, said bolt extending through the slots of the second leaves of said springs to permit sliding movement thereof relative to the bolt and main leaves.

8. A spring suspension for automobiles comprising a quarter spring rigidly secured at one end to the frame of an automobile and extending longitudinally therefrom; and a main spring rigidly secured at one end to the frame and rigidly secured at the opposite end to the outwardly extending end of the quarter spring, the ends of said spring being held in flat contacting relation with the frame and with the quarter spring along a variable length increasing with flexing of the spring under an increased shock or load.

9. In a spring suspension for automobiles, a main spring having a main leaf rigidly secured at its ends in flat proximate contacting relation to members supported thereon, the flexing of said spring causing varying lengths of the ends of the main leaf to contact with the adjacent surfaces of the supported member to vary the effective length of the spring under varying stress and control the flexing of the spring; a plurality of supporting spring leaves mounted in connection with the main leaf, the supporting leaf immediately adjacent the main leaf being slotted to receive the securing means by which the main leaf is secured to the supported members to permit longitudinal movement and prevent lateral movement of the supporting leaf relative to the main leaf.

10. In a spring suspension for automobiles, the combination with a vehicle frame member having an upwardly curved portion, of a spring provided with a main leaf rigidly secured to the frame member adjacent the upwardly curved portion thereof in flat contacting relation thereto; and spring means rigidly secured to the frame and rigidly secured in flat contacting relation to the free end of the main spring leaf, said main spring leaf being flexed under stress to conform to the contour of the curved frame portion and to contact with the spring means along varying lengths of the main leaf to vary the effective length of the main spring and control the flexing thereof under varying stress.

In witness whereof, I hereunto set my signature.

ULYSSES A. INMAN.